(12) United States Patent
Xiao

(10) Patent No.: US 7,789,656 B2
(45) Date of Patent: Sep. 7, 2010

(54) INJECTION MOLDING DEVICE

(75) Inventor: Lan Xiao, Guangdong (CN)

(73) Assignees: Premier Image Technology(China) Ltd., Foshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/147,500

(22) Filed: Jun. 27, 2008

(65) Prior Publication Data

US 2009/0246312 A1  Oct. 1, 2009

(30) Foreign Application Priority Data

Mar. 28, 2008  (CN) .................. 2008 1 0300783

(51) Int. Cl.
*B29C 45/00* (2006.01)
(52) U.S. Cl. .................. 425/572; 425/547; 425/552; 425/808; 425/567
(58) Field of Classification Search .............. 425/552, 425/547, 808, 572, 567; 264/1.32
See application file for complete search history.

(56) References Cited

U.S. PATENT DOCUMENTS 4,252,294 A * 2/1981 Uchio .................. 249/105
5,540,410 A * 7/1996 Lust et al. .................. 249/134
RE37,719 E 5/2002 Sugiyama et al.
6,528,158 B1 3/2003 Kuroda
7,008,211 B2 * 3/2006 Lee .......................... 425/190

FOREIGN PATENT DOCUMENTS

| JP | 2220822 A | 9/1990 |
|----|-----------|--------|
| JP | 2006046436 A | 2/2002 |
| JP | 200267100 A | 3/2002 |
| JP | 3288900 B2 | 6/2002 |

\* cited by examiner

*Primary Examiner*—Maria Veronica D Ewald
(74) *Attorney, Agent, or Firm*—Zhigang Ma

(57) ABSTRACT

An injection molding device for thermosetting molding materials includes a male mold portion, and a female mold portion. The male mold portion includes an injection aperture and a sprue communicated with the injection aperture. The female mold portion is mated with the male mold portion to define a parting face therebetween and includes a cold slug well and a main runner. The cold slug well is disposed at an opposite end of the sprue relative to the injection aperture and has at least two inner sidewalls perpendicular to each other. The main runner is defined in the parting face and commutating with the sprue. The refractive index of the products molded using the injection molding device may be obtained via directly measuring that of the cold slug after molding. Therefore, the time spent to measure the refractive index of the products is less than the conventional method.

10 Claims, 4 Drawing Sheets

INJECTION MOLDING DEVICE

RELATED FIELD

The present invention relates to an injection molding device, and in particular, to an injection molding device having a cold slug well.

BACKGROUND

Before optical elements, such as lenses, are assembled into lens modules, its refractive index must be measured to confirm performance of the lens. Generally, the refractive index of the optical elements is measured via a typical V-shaped prism measuring method. One requisite condition is that a V-shaped prism used in the method has two plane being perpendicular to each other if using the V-shaped prism measuring method. However, optical elements molded by conventional injection molding device do not meet this requirement. Therefore, the optical elements must be re-machined, which is time-consuming and inefficient.

It is therefore desired to provide an injection molding device, which can overcome the above-described deficiency.

SUMMARY

In accordance with the present invention, an injection molding device for thermosetting molding materials includes a male mold portion, and a female mold portion. The male mold portion includes an injection aperture and a sprue communicated with the injection aperture. The female mold portion is mated with the male mold portion to define a parting face therebetween and includes a cold slug well and a main runner. The cold slug well is disposed at an opposite end of the sprue relative to the injection aperture and has at least two inner sidewalls perpendicular to each other. The main runner is defined in the parting face and communicating with the sprue.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of preferred and exemplary embodiments thereof with reference to the accompanying drawings, in which.

DETAILED DESCRIPTION OF EXEMPLARY EMBODIMENTS

A detailed explanation of an injection molding device according to an exemplary embodiment of the present invention will now be made with reference to the drawings attached hereto.

Figure 1:
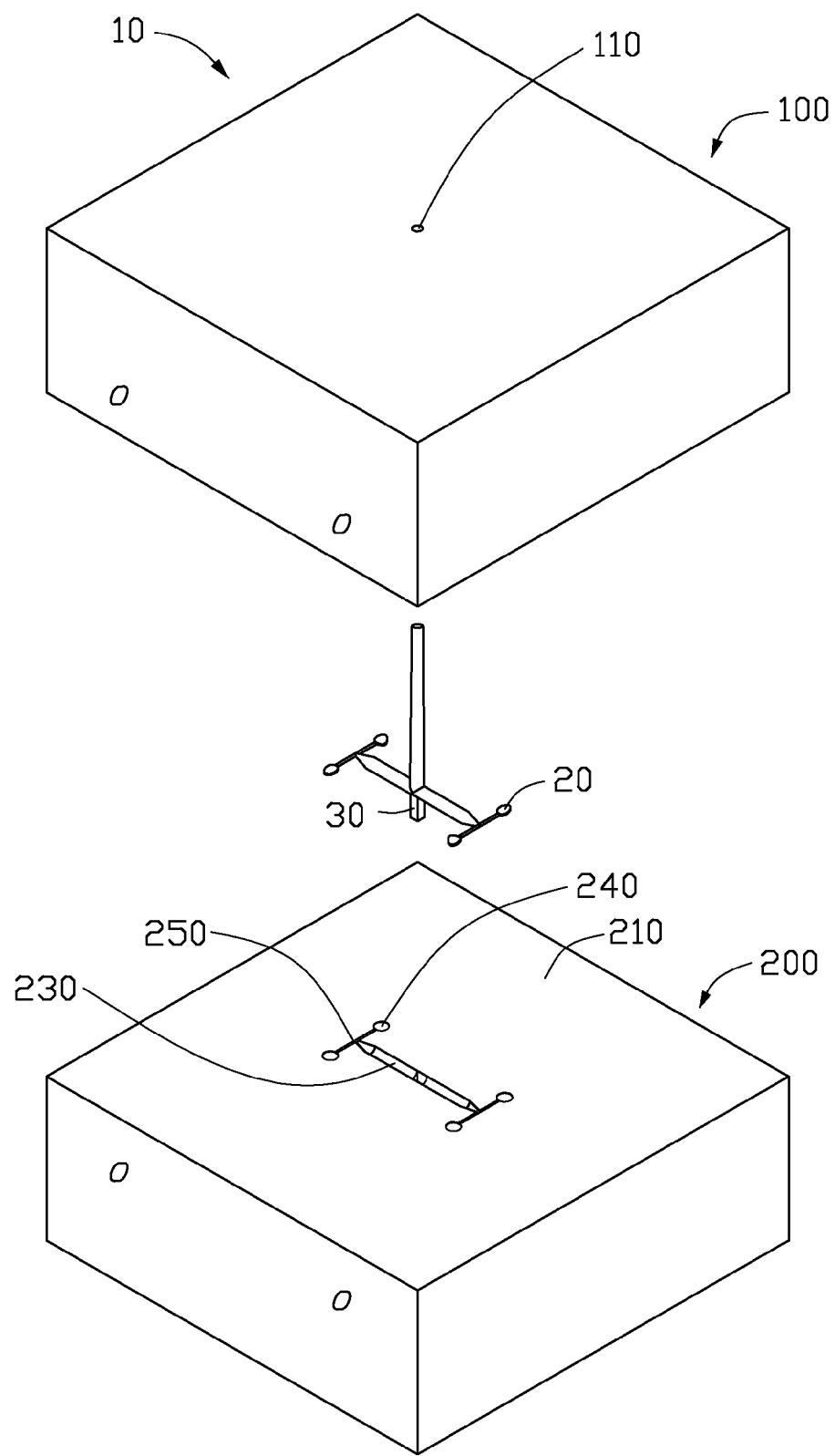
FIG. 1 is an isometric, exploded view of an injection molding device and a molded product according to an exemplary embodiment.
Figure 2:
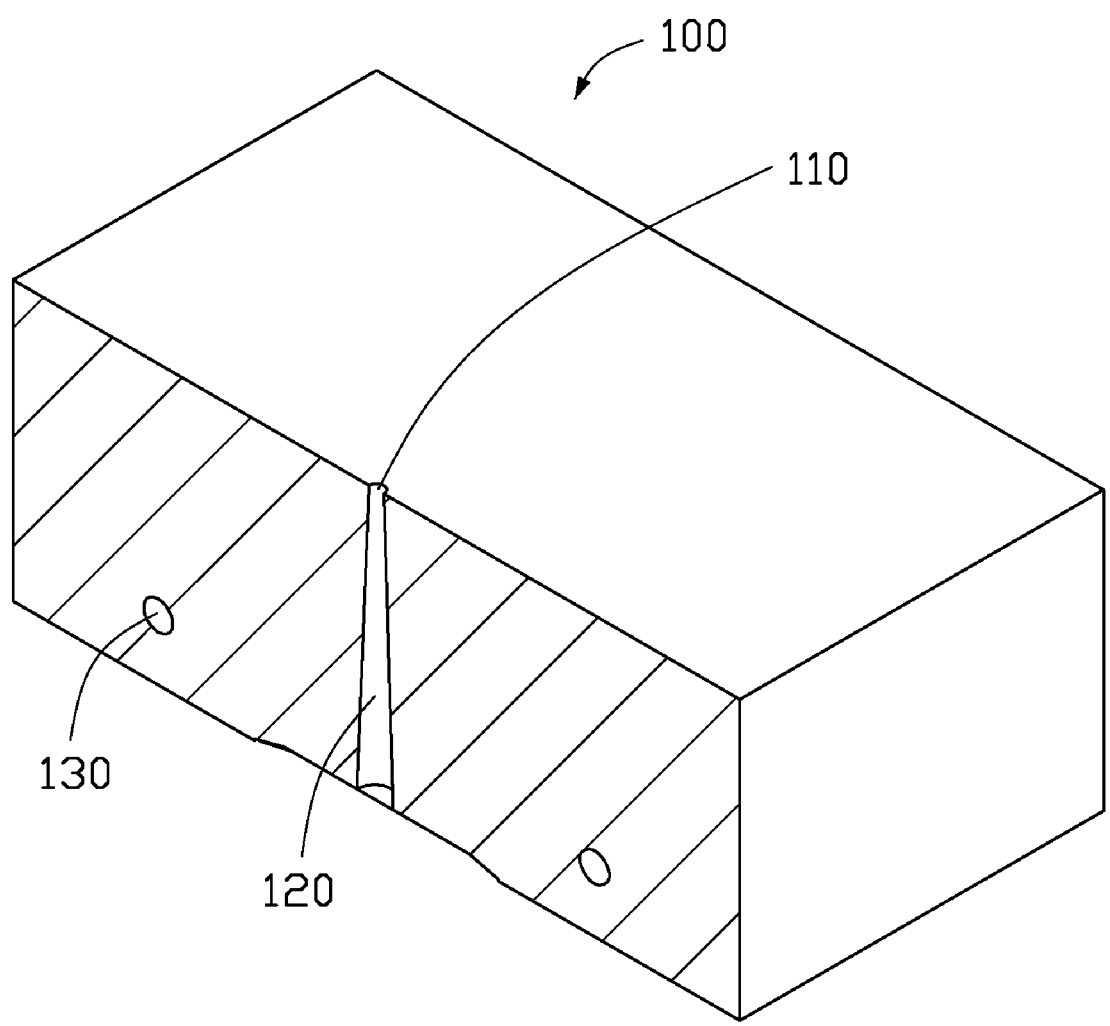
FIG. 2 is an isometric, cross-sectional view of a male mold portion of the injection molding device of FIG. 1.
Figure 3:
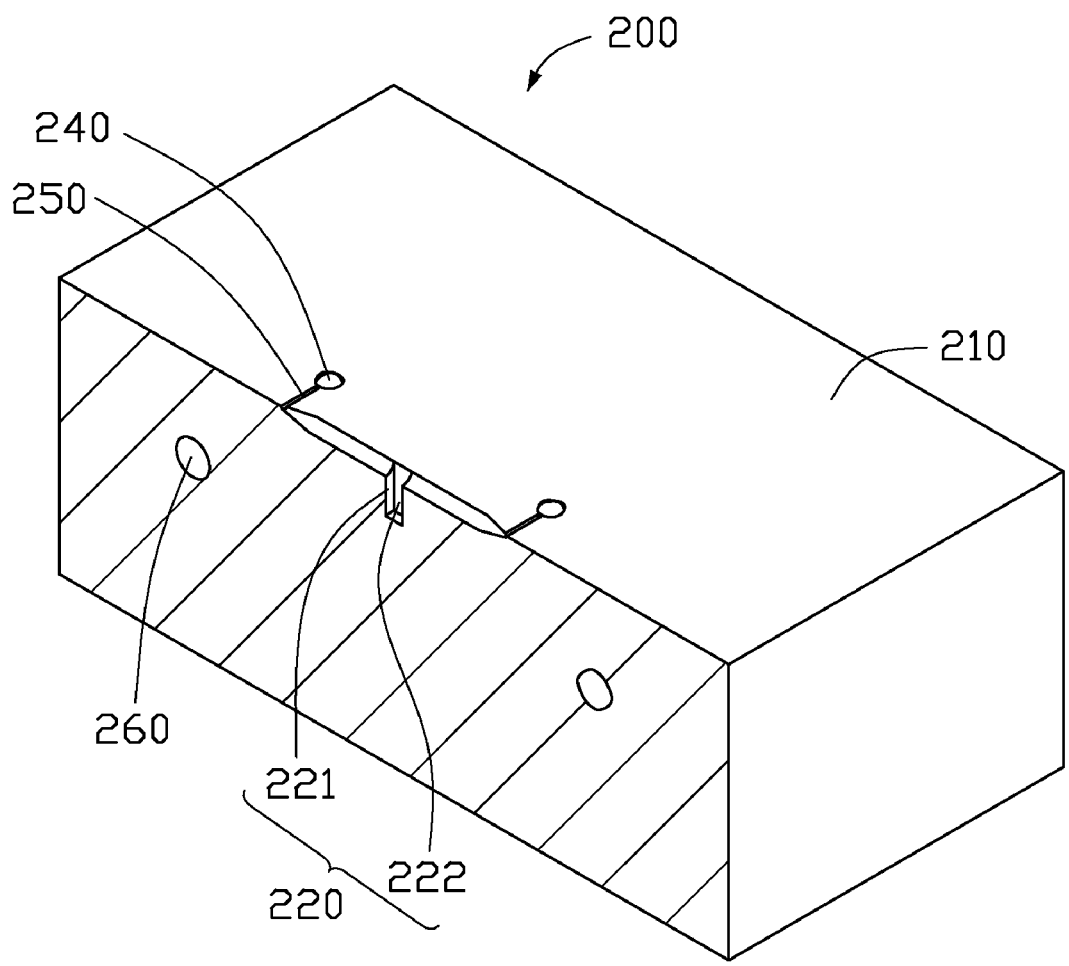
FIG. 3 is an isometric, cross-sectional view of a female mold portion of the injection molding device of FIG. 1.

Referring to FIGS. 1 through 3, an injection molding device 10 according to the present embodiment is shown. The injection molding device 10 includes a male mold portion 100 and a female mold portion 200, which can both be made of metal. The male mold portion 100 connected to an injection molding machine (not shown) when mated with the female mold portion 200 defines a parting face 210 therebetween.

It should be noted that the injection molding device 10 can be used in molding of plastic, glass, or other like materials. In the exemplary embodiment, the material to be molded is plastic presented only as an example to explain configurations and working principles of the injection molding device 10.

The male mold portion 100 includes an injection aperture 110 and a sprue 120 communicating with the injection aperture 110. The injection aperture 110 is configured for receiving an injection nozzle (not shown) of the injection molding machine. The injection nozzle is used for transporting the molten plastic into the injection molding device 10. The sprue 120 is generally perpendicular to the parting face 210 and configured for leading the molten plastic to flow through the male mold portion into the female mold portion 200. The male mold portion 100 further includes a first cooling loop 130 (see FIG. 2) configured for cooling the molten material and adjusting the temperature of the molten plastic for adjusting a viscosity of the molten plastic.

The female mold portion 200 includes a cold slug well 220, a main runner 230, at least one mold cavity 240, and at least a branch runner 250 disposed between the main runner 230 and the mold cavity 240.

The cold slug well 220 is disposed at an opposite end of the sprue 120 relative to the injection aperture 110 and configured for removing the unnecessary part of the molten plastic and preventing it from flowing into the mold cavity 240. The cold slug well 220 has at least two inner sidewalls 221, 222 (see FIG. 3) perpendicular to each other. Thus, a cold slug 30 molded in the cold slug well 220 has two outer sidewalls perpendicular to each other for measuring a refractive index of the cold slug 30. The cold slug well 220 may be a blind hole having square, rectangular, right triangular cross-section, or the like. In the present embodiment, the cold slug well 220 is a rectangular bind hole. It should be noted two cold slug wells 210 may be respectively disposed in two ends of the main runner 230 when the main runner 230 has a greater length than a standard main runner.

The main runner 230 is disposed in the parting face 210 and communicated with the sprue 120. The mold cavity 240 is defined in the female mold portion 200 on the parting face 210 and has a form corresponding to that of an object to be molded, such as a lens 20, or the like. There can normally be only one mold cavity defined in the parting face 210, if however, more than one mold cavity is defined, then generally, it should be an even number mold cavities symmetrically arranged at the parting face 210. In the exemplary embodiment, four mold cavities 210 are presented as an example. Correspondingly, four branch runners 250 are respectively defined between the main runner 220 and the mold cavities 210 for uniformly distributing the molten plastic into each mold cavity.

It should be noted that the female mold portion 200 further includes at least one second cooling loop 260 disposed in the female mold portion 200. The second cooling loop 260 is configured for cooling a molded lens 20.

Figure 4:
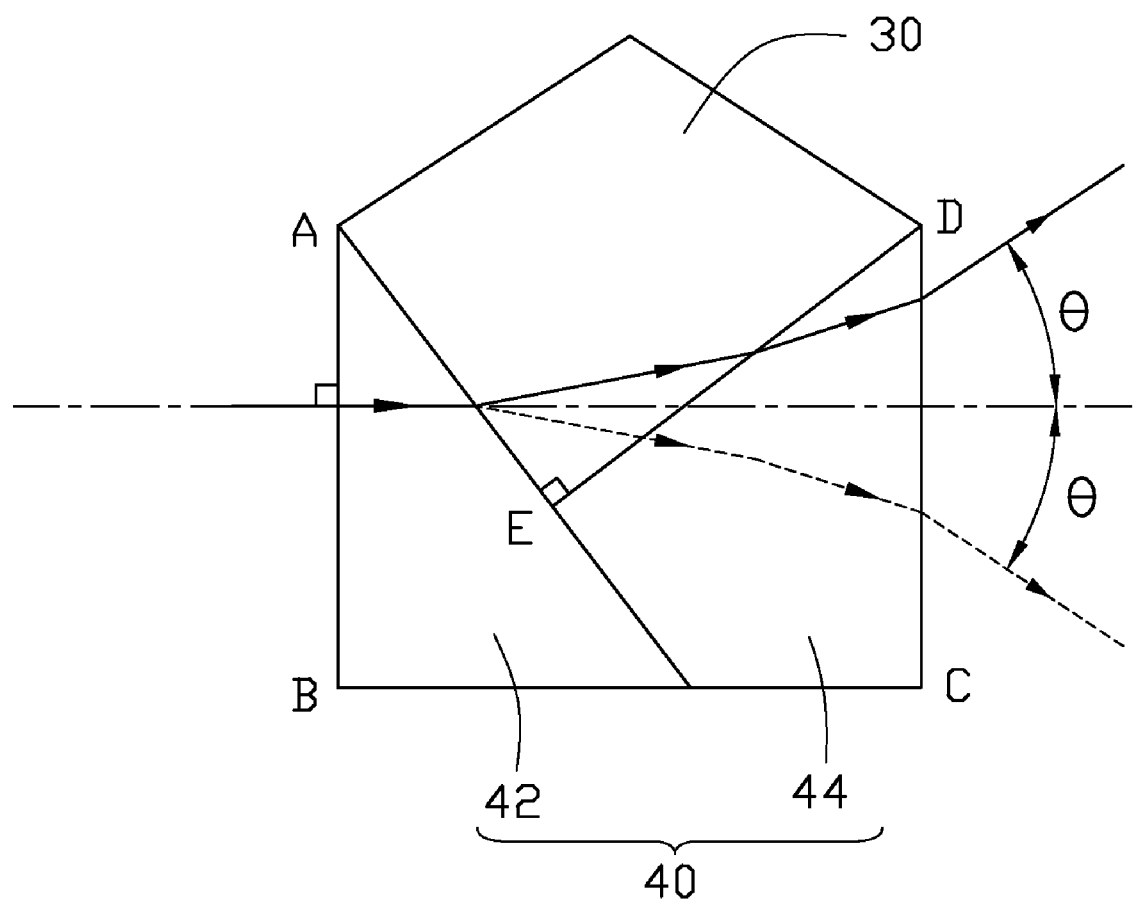
FIG. 4 is a schematic view of a V-shaped prism for measuring a refractive index of a cold slug molded by the injection molding device of FIG. 1.

A V-shaped prism 40 shown in FIG. 4 is used for measuring the refractive index of the cold slug 30 for determining performance of the lens 20. The V-shaped prism 40 includes a first right triangular prism 42 and a second right triangular prism 44 glued or adhered to the first right triangular prism

42. The second right triangular prism 44 has the same refractive index as the first right triangular prism 42. And a V-shaped opening is formed between the first, second right triangular prisms 41, 42. It is assumed that a refractive index of the V-shaped prism 40 is $n_0$. A field angle of the V-shaped opening is 90°. In use, the cold slug 30, once molded, is set in the V-shaped opening, and parallel light is directed into an AB side of the first right triangular prism 42, the light passes through the cold slug 30, then exits from a CD side of the second right triangular prism 44. The refractive index of the molded cold slug can be calculated using the following formula:

$$n=[n_0^2 \pm \sin\theta(n_0^2-\sin^2\theta)]^{1/2}$$

Wherein:

n is the refractive index of the cold slug;

$n_0$ is the refractive index of the V-shaped prism 40; and

θ is an angle between the incident light and the emergent light.

As a result, the refractive index of the lens 20, molded using the injection molding device, may be obtained via directly measuring that of the cold slug after molding. Therefore, the time spent to determine the refractive index of the lens 20 is less than that by the conventional method.

It should be understood that the above-described embodiment is intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. An injection molding device, comprising:
   a male mold portion comprising an injection aperture and a sprue communicated with the injection aperture; and
   a female mold portion mating with the male mold portion to define a parting face therebetween, the female mold portion comprising a cold slug well disposed at an opposite end of the sprue relative to the injection aperture and having at least two connecting inner sidewalls perpendicular to each other and a main runner defined in the parting face and communicating with the sprue;
   wherein a cold slug molded in the cold slug well comprises at least two connecting surfaces, which are required by a V-shaped prism refractive measuring method.

2. The injection molding device as claimed in claim 1, wherein the male mold portion further defines a first cooling loop for cooling a molten material in the male mold portion.

3. The injection molding device as claimed in claim 1, wherein the female mold portion further defines a second cooling loop for cooling a raw material in the female mold portion.

4. The injection molding device as claimed in claim 1, wherein the cold slug well is a square blind hole.

5. The injection molding device as claimed in claim 1, wherein the cold slug well is a rectangular blind hole.

6. The injection molding device as claimed in claim 1, wherein the cold slug well is a right triangular blind hole.

7. The injection molding device as claimed in claim 1, further comprising a mold cavity defined in the parting face and communicated with the main runner.

8. The injection molding device as claimed in claim 1, further comprising two mold cavities defined in the parting face and arranged symmetrically two end of the main runner relative to the sprue.

9. The injection molding device as claimed in claim 1, further comprising four mold cavities defined in the parting face and four branch runners defined in the parting face and respectively arranged between the main runner and the mold cavities.

10. The injection molding device as claimed in claim 1, further comprising a plurality of mold cavities defined in the parting face and the same number of branch runners as the number of the mold defined in the parting face, wherein each of the branch runners connects one corresponding mold cavity with the main runner.

* * * * *